(12) United States Patent
Pelletier et al.

(10) Patent No.: US 9,229,310 B2
(45) Date of Patent: Jan. 5, 2016

(54) DISPLAY DEVICE COMPRISING A SCREEN HAVING A NETWORK OF THREE DIMENSIONAL REFLECTIVE MICROSTRUCTURES

(71) Applicant: THALES, Neuilly sur Seine (FR)

(72) Inventors: Sebastien Pelletier, Merignac (FR); Aude Gueguen, Bordeaux (FR); Matthieu Grossetete, Cenon (FR); Jean-Luc Bardon, Martignas sur Jalle (FR); Laurent Laluque, Bordeaux (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/567,659

(22) Filed: Dec. 11, 2014

(65) Prior Publication Data

US 2015/0160545 A1 Jun. 11, 2015

(30) Foreign Application Priority Data

Dec. 11, 2013 (FR) ...................................... 13 02897

(51) Int. Cl.
*G03B 21/60* (2014.01)
*G02B 27/01* (2006.01)
(Continued)

(52) U.S. Cl.
CPC ............. *G03B 21/60* (2013.01); *G02B 3/0006* (2013.01); *G02B 5/021* (2013.01); *G02B 5/0284* (2013.01); *G02B 27/0101* (2013.01);
(Continued)

(58) Field of Classification Search
CPC ..................... G02B 2027/011; G02B 27/0101; G02B 27/0172; G02B 2027/0178; G02B 5/021; G03B 21/56; G03B 21/60; G03B 21/62

USPC .......................................................... 359/459
See application file for complete search history.

(56) References Cited

U.S. PATENT DOCUMENTS 5,539,578 A * 7/1996 Togino et al. .................. 359/630
5,982,343 A * 11/1999 Iba et al. ............................ 345/8
(Continued)

FOREIGN PATENT DOCUMENTS

DE  10 2009 010537 A1  8/2010
EP       2 469 324 A1   6/2012
(Continued)

OTHER PUBLICATIONS

French Search Report for French Counterpart Application No. FR 1302897, 7 pgs. (Sep. 3, 2014).

*Primary Examiner* — Christopher Mahoney
(74) *Attorney, Agent, or Firm* — Blakely, Sokoloff, Taylor & Zafman LLP

(57) ABSTRACT

The general field of the invention is that of display systems including an image projector and an associated display screen, said display system being intended for use by an observer situated at a specified location, said display screen having two transparent and substantially parallel faces, and said display screen having on at least one of its transparent faces a plurality of regularly distributed optical patterns. The image projector according to the invention illuminating the screen at a plurality of angles of incidence determined by the position and size of the display screen, and said angles of incidence being centered on an average angle of incidence, the optical patterns have at least one curved reflective surface orientated so as to reflect the light rays having at least the average angle of incidence in one or more directions corresponding to said specified location of the observer. A plurality of embodiments are described.

8 Claims, 4 Drawing Sheets

SECTIONAL VIEW

(51) Int. Cl.
  *G02B 5/02* (2006.01)
  *G02B 3/00* (2006.01)
(52) U.S. Cl.
  CPC .. *G02B 2027/013* (2013.01); *G02B 2027/0118* (2013.01); *G02B 2027/0127* (2013.01)

(56) References Cited

U.S. PATENT DOCUMENTS 8,384,999 B1    2/2013    Crosby et al.
8,582,209 B1    11/2013   Amirparviz
2007/0146876 A1   6/2007    Peterson et al.
2009/0027771 A1*  1/2009    Champion ............... 359/459
2012/0002294 A1*  1/2012    Dobschal et al. ......... 359/630
2012/0162734 A1*  6/2012    Lambert .................. 359/13

FOREIGN PATENT DOCUMENTS

FR    2 986 624 A1    8/2013
WO    WO 96/05533 A1  2/1996

* cited by examiner

DISPLAY DEVICE COMPRISING A SCREEN HAVING A NETWORK OF THREE DIMENSIONAL REFLECTIVE MICROSTRUCTURES

BACKGROUND OF THE INVENTION

1. Field of the Invention

The field of the invention is that of display devices projecting an image on a semi-transparent screen. These devices can be used to display an image facing the user in superimposition on the exterior landscape. One of the possible fields of use is the presentation of information in vehicles, and more precisely in aircraft cockpits, particularly those which have large glazed surfaces.

2. Description of the Prior Art

These display systems enable the user's attention to be kept on his surrounding environment, while providing him with instantaneous access to additional information. In the case of vehicle driving, having information is displayed in the visual field of the external environment means that the user avoids having to look for this information on screens which are conventionally located on his dashboard or instrument panel.

There are various technical solutions for projecting an image on a semi-transparent screen. The most commonly used is shown in FIG. 1. It consists in projecting the image emerging from a projector P emitting in the visible spectrum on to the surface of a transparent diffusing film E. The diffuser diffuses the projected image towards the eye Y of the observer, while remaining relatively transparent, thus providing a view of the exterior. The compromise between transmission and diffusion is not easily found. Diffusing films are used for the projection of advertising on to glazed walls of shops. However, the technique is mainly used at night, that is to say at low ambient light levels. In the daytime, the results of this technique are mediocre. This is because, as shown in FIG. 2, the film E diffuses the sunlight S in all directions (shown by striped straight arrows in FIG. 2). The transmission of the exterior light is represented by a sequence of chevrons in this figure. In these conditions, the film appears milky, the transparency is limited, and the performance of the projected image in terms of reflection and luminosity is poor and unsatisfactory.

The present applicant has therefore proposed, in the application FR 2 986 624 entitled "Optical projector with semi-transparent projection screen", a display screen including a plurality of light-diffusing patterns regularly distributed over a transparent surface, these patterns possibly including a reflective treatment. By comparison with the preceding systems, the semi-transparent screen of this projector has high transparency combined with high luminosity of the projected image, while also having limited diffraction.

However, the light rays emerging from the projector and diffused by the screen all have a known angle of incidence. Similarly, the solar illumination can only come from certain directions, as certain parts of the cockpit form a natural mask. The prior screen is isotropic. It does not make a fine allowance for the variations in the angle of incidence of the light rays from the projector so as to optimize the performance in terms of diffusion towards the observer's eye.

SUMMARY OF THE INVENTION

The screen according to the invention does not have these drawbacks. It includes patterns orientated so as to allow for the positions of the image projector and the user, in order to provide optimal distribution of the light. Additionally, the diffusion by solar illumination is minimized. More precisely, the invention proposes a display system including an image projector and an associated display screen, said display system being intended for use by an observer situated at a specified location, said display screen including two transparent and substantially parallel faces, and said display screen having on at least one of its transparent faces a plurality of regularly distributed optical patterns, characterized in that, the image projector illuminating the screen at a plurality of angles of incidence determined by the position and size of the display screen, and said angles of incidence being centred on an average angle of incidence, the optical patterns have at least one curved reflective surface orientated so as to reflect the light rays having at least the average angle of incidence in one or more directions corresponding to said specified location of the observer.

Advantageously, the orientation of each pattern is adapted to the angle of incidence of the light which emerges from the image projector and which illuminates said pattern.

Advantageously, each pattern has a single convex reflective surface.

Advantageously, each pattern has only a single concave reflective surface.

Advantageously, each pattern has only two concave reflective surfaces.

Advantageously, the two concave reflective surfaces are cylindrical and inclined with respect to the plane of the transparent faces, the two surfaces substantially forming a dihedral, the axis of the first cylindrical surface being parallel to the plane of the transparent faces, the axis of the second cylindrical surface lying in a plane perpendicular to said plane of the transparent faces.

Advantageously, the patterns are pentaprisms applied to one of the transparent faces, each pentaprism having a flat input face directed towards the image projector, an output face having a curved part directed towards the user, two flat reflective planes and a curved reflective face.

Advantageously, each pattern has a microlens positioned on a first transparent face and a micromirror positioned on the second transparent face, the focal length of the microlens being substantially equal to the optical thickness of the screen, the micromirror being positioned in the focusing area of the microlens.

BRIEF DESCRIPTION OF THE DRAWINGS

The invention will be more clearly understood and other advantages will be apparent from the following description provided in a non-limiting way with reference to the attached drawings, in which.

DETAILED DESCRIPTION

The display system according to the invention includes an image projector and a special associated display screen. The image emitted by the image projector is formed on, or in the immediate vicinity of, the surface of the display screen. This display screen has two transparent and substantially parallel faces. These faces are not necessarily flat, and the screen according to the invention may be entirely incorporated into a curved windscreen, for example.

In very many applications, particularly when the display system is integrated into a cockpit or into a driver's cab, the position of the projector with respect to the screen is entirely predetermined and the user's eyes occupy a predetermined location, called the "eye box" in some applications. Similarly, the solar illumination can only come from certain directions, as the cockpit creates natural masking.

The screen according to the invention makes use of this property. When a plurality of light-reflecting patterns regularly distributed over one of its transparent faces is provided, these patterns may be arranged in such a way that, the image projector illuminating the screen at a plurality of angles of incidence determined by the position and size of the display screen, and said angles of incidence being centred on an average angle of incidence, the optical patterns have at least one curved reflective surface orientated so as to reflect the light rays having at least the average angle of incidence in one or more directions corresponding to said specified location of the observer. The radii of curvature of the patterns are small, being of the order of several hundreds of microns. Evidently, therefore, any change in the angle of incidence causes a very large change in the direction of the reflected ray, eliminating any light ray that did not emerge from the projector.

Figure 1:
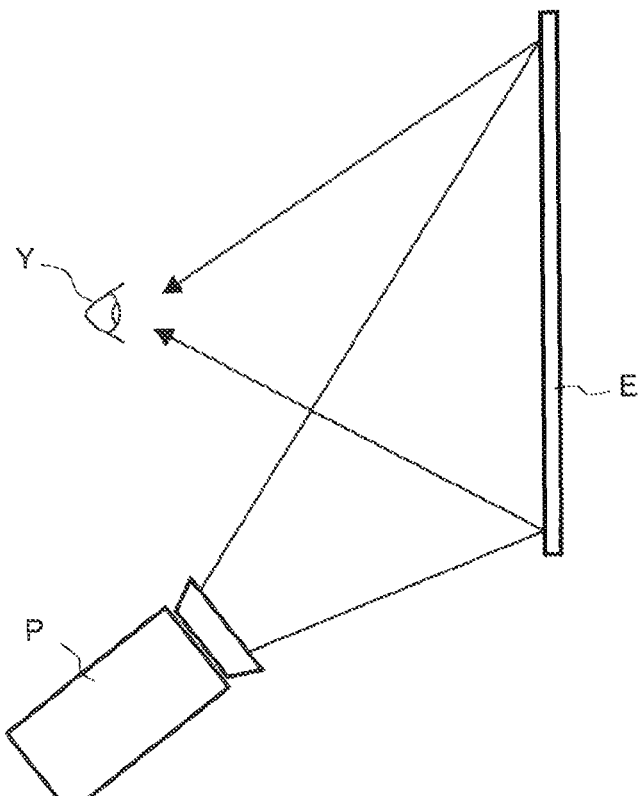
FIG. 1, mentioned above, shows a schematic diagram of an image projector display system according to the prior art.
Figure 2:
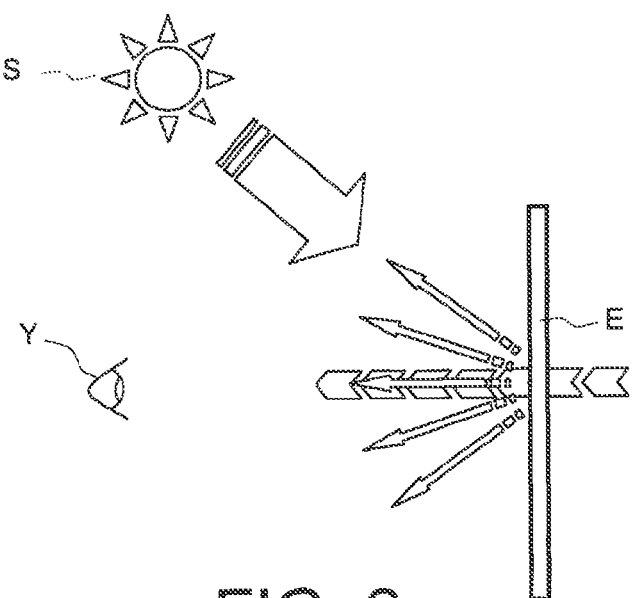
FIG. 2, mentioned above, shows solar diffusion on a display screen according to the prior art.
Figure 3:
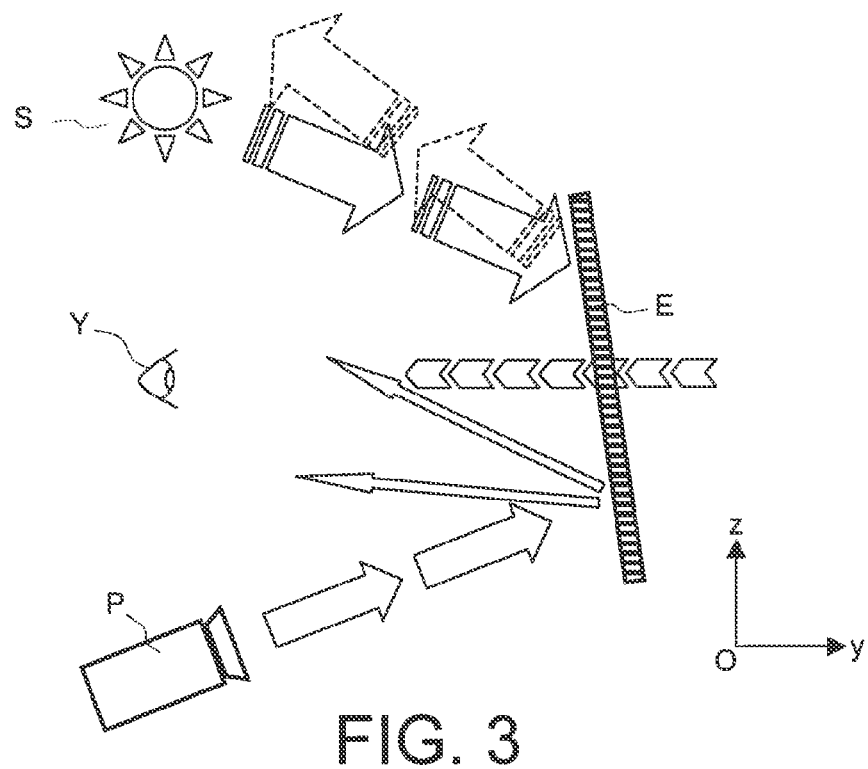
FIG. 3 shows a display system having a display screen according to the invention.

This property is shown in FIG. 3. The sun's rays S are not diffused towards the observer's eye Y, whereas the rays emerging from the projector P are diffused towards the eye by the screen E.

Display screens having patterns according to the invention may be divided into two major types. In the first type, all the patterns on the screen are strictly identical. In the second type, each pattern is defined according to the average angle of incidence of the light rays emerging from the projector on the pattern. Thus the radii of curvature or the inclinations of the reflective surfaces may be varied.

As a general rule, the sizes of the patterns range from the order of several tens of microns to several hundreds of microns. The percentage of the screen surface occupied by the patterns determines the transmission rate of the display screen. Thus, if the patterns occupy 20% of the screen surface, the transmission rate excluding losses due to vitreous reflection cannot exceed 80%. The construction of these patterns does not entail any particular difficulties in construction.

By way of non-limiting example, FIGS. 4 to 7 show different embodiments of a display screen according to the invention. These figures are all referenced with respect to the same reference frame (O, x, y, z) which is also that of FIG. 3, and all show either sectional views or top views of a part of a screen including a pattern. The views are indicated in the figures. The bent arrows in the sectional views indicate the reflection of a light ray emerging from the projector on the pattern, with the head of the arrow pointing towards the observer.

Figure 4:
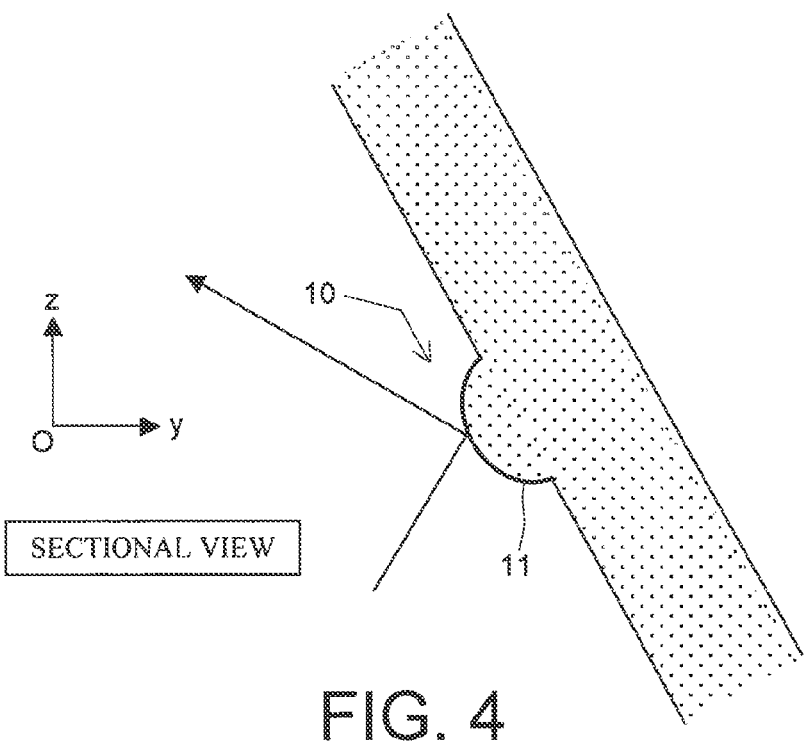
FIG. 4 shows a sectional view of a first embodiment of a display screen according to the invention.

FIG. 4 shows, in a sectional view, a first embodiment of the patterns according to the invention. Each pattern 10 is a portion of a convex curved micromirror 11 having a small radius of curvature. This curved portion is located on a first transparent face directed towards the observer. It is shown in bold print in FIG. 4. Each micromirror reflects the incident light from the projector towards the eye box, in a specular manner. The equivalent focal length of the micromirror is adjusted so as to create in the plane of the eye box a defocusing covering the transverse dimensions of the eye box. Thus the extension of the defocused spot is directly dependent on the working area of the micromirror. Any unused parts of the pattern and the surfaces for connection to the screen surface which have no optical function may be covered by an absorbent treatment so as to suppress any light diffusion. The shape of the reflective surface portion may be adjusted so as to provide uniform distribution of the illumination in the eye box. As a variant, a concave mirror may be used in place of the convex mirror.

Figure 5:
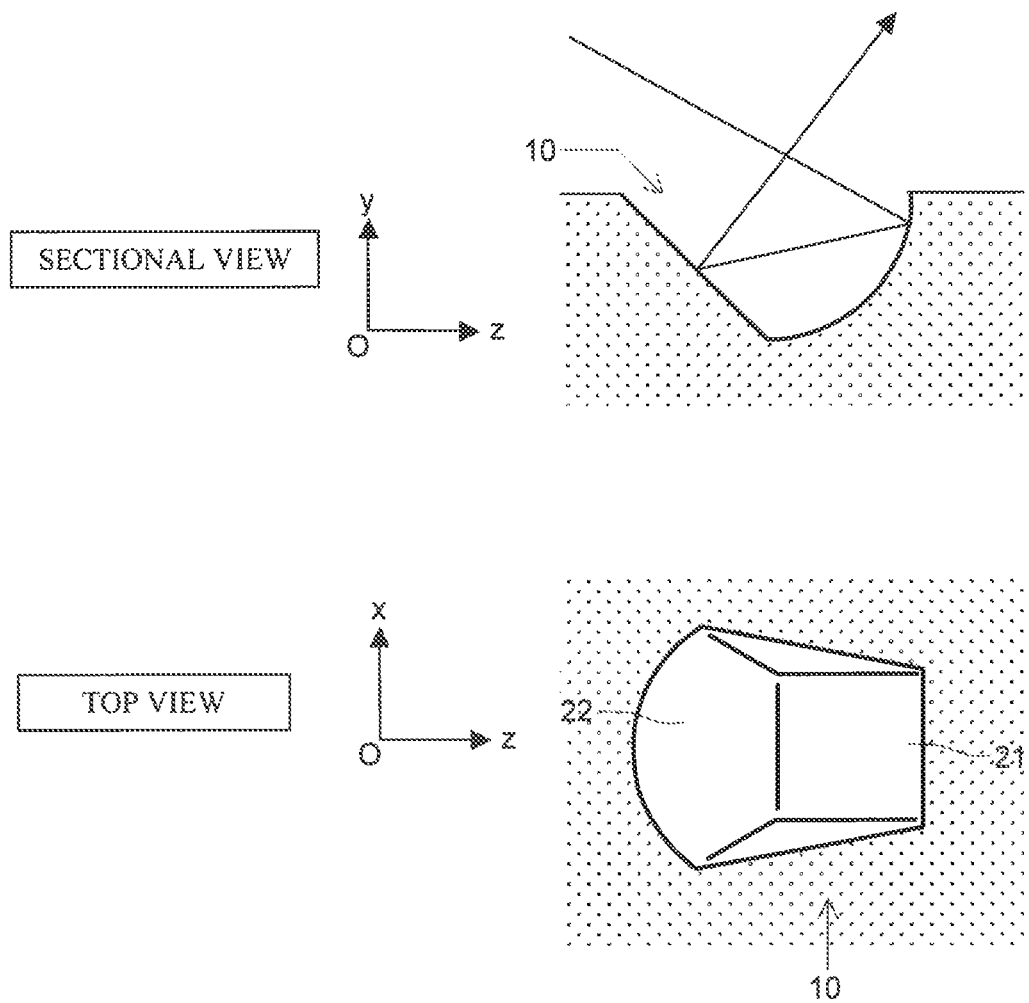
FIG. 5 shows a sectional view and a top view of a second embodiment of a display screen according to the invention.

FIG. 5 shows a second embodiment of the patterns. In this configuration, each pattern 10 is cut into a transparent face and has two cylindrical reflective surfaces 21 and 22 inclined with respect to the plane of the transparent faces, the two surfaces substantially forming a dihedral, the axis of the first cylindrical surface being parallel to the plane of the transparent faces, and the axis of the second cylindrical surface lying in a plane perpendicular to said plane of the transparent faces. The two cylindrical surfaces are limited by two flat cut panels. The radii of the two cylindrical surfaces may be similar, being of the order of several hundreds of microns. The light rays emerging from the projector are reflected by the first cylindrical surface, and then by the second cylindrical surface. This configuration enables the reflected beams to be scattered in a different aperture according to the axis.

Figure 6:
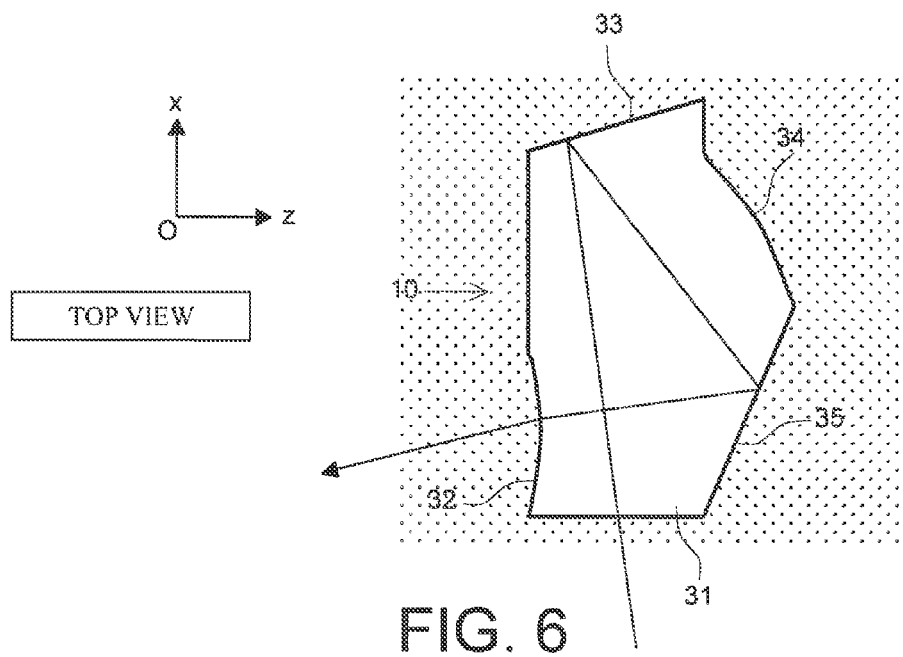
FIG. 6 shows a top view of a third embodiment of a display screen according to the invention.

FIG. 6 shows a third embodiment of the patterns. The patterns 10 are pentaprisms applied to one of the transparent faces. Conventionally, a pentaprism is an optical prism having five flat faces which are, respectively, an input face, a first reflective face, a second reflective face and an output face. The fifth face has no optical function. A light ray entering through the first face emerges perpendicularly to itself through the output face after two successive reflections on the reflective surfaces. The pentaprism according to the invention has the same general function as a conventional pentaprism and also has an input face 31 and an output face 32, substantially perpendicular to each other. However, some faces are curved to give the pentaprism a considerable optical power. Thus, by way of example, each pentaprism according to the invention has a flat input face 31 directed towards the image projector, an output face 32 having a curved part directed towards the user, two flat reflective planes 33 and 35, and a fifth curved reflective face 34. The radii of the curved faces are of the order of several hundred microns.

Figure 7:
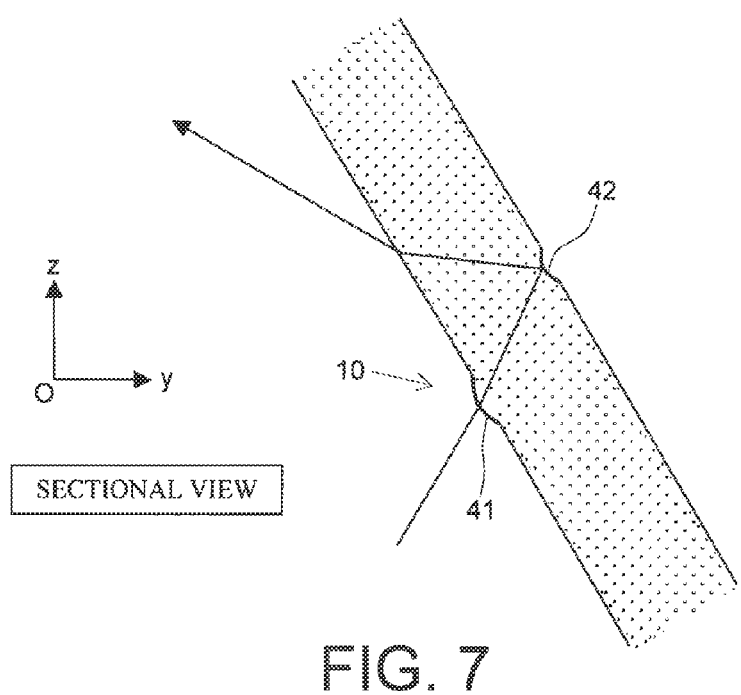
FIG. 7 shows a sectional view of a fourth embodiment of a display screen according to the invention.

FIG. 7 shows a sixth embodiment of the patterns according to the invention. Each pattern 10 has a microlens 41 positioned on a first transparent face of the display screen and a convex micromirror 42 positioned on the second transparent face, the focal length of the microlens being substantially equal to the optical thickness of the screen, the micromirror being positioned in the focusing area of the microlens. Thus the angle of diffusion towards the observer can be selected by adjusting the radius of the convex mirror.

What is claimed is:

1. A display system including an image projector and an associated display screen, the display system being intended for use by an observer situated at a specified location, the display screen having two transparent and substantially parallel faces, and the display screen having on at least one of its transparent faces a plurality of regularly distributed optical patterns, wherein the image projector forms projected images on the display screen at a plurality of angles of incidence determined by a position and a size of the display screen, wherein the angles of incidence are centred on an average angle of incidence, and wherein the optical patterns have at least one curved reflective surface orientated so as to reflect light rays having at least the average angle of incidence in one or more directions corresponding to the specified location of the observer.

2. The display system according to claim 1, wherein the orientation of each pattern is adapted to the angle of incidence of light which emerges from the image projector and which illuminates the pattern.

3. The display system according to claim 1, wherein each pattern has a single convex reflective surface.

4. The display system according to claim 1, wherein each pattern has only a single concave reflective surface.

5. The display system according to claim 1, wherein each pattern has only two concave reflective surfaces.

6. The display system according to claim 5, wherein the two concave reflective surfaces are cylindrical and inclined with respect to a plane of the transparent faces, the two surfaces substantially forming a dihedral, an axis of the first cylindrical surface being parallel to the plane of the transparent faces, and an axis of the second cylindrical surface lying in a plane perpendicular to the plane of the transparent faces.

7. The display system according to claim 1, wherein the patterns are pentaprisms applied to one of the transparent faces, each pentaprism having a flat input face directed towards the image projector, an output face having a curved part directed towards the user, two flat reflective planes and a curved reflective face.

8. The display system according to claim 1, wherein each pattern has a microlens positioned on a first transparent face of the two transparent faces and a convex micromirror positioned on a second transparent face of the two transparent faces, a focal length of the microlens being substantially equal to an optical thickness of the screen, the micromirror being positioned in a focusing area of the microlens.

* * * * *